(12) United States Patent
Epaud et al.

(10) Patent No.: US 10,106,057 B2
(45) Date of Patent: Oct. 23, 2018

(54) SEAT FOR MOTOR VEHICLE AND MOTOR VEHICLE COMPRISING SUCH A SEAT

(71) Applicant: Faurecia Sièges d'Automobile, Nanterre (FR)

(72) Inventors: David Epaud, Guigneville (FR); Fabrice Lesbat, Sucy en Brie (FR); Mourad Bouzid, Antony (FR)

(73) Assignee: Faurecia Sièges D'Automobile, Nanterre (FR)

( * ) Notice: Subject to any disclaimer, the term of this patent is extended or adjusted under 35 U.S.C. 154(b) by 64 days.

(21) Appl. No.: 15/333,615

(22) Filed: Oct. 25, 2016

(65) Prior Publication Data

US 2017/0113575 A1     Apr. 27, 2017

(30) Foreign Application Priority Data

Oct. 27, 2015   (FR) ...................... 15 60272

(51) Int. Cl.
| | |
|---|---|
| *B60N 2/00* | (2006.01) |
| *B60N 2/02* | (2006.01) |
| *B60N 2/07* | (2006.01) |
| *B60N 2/08* | (2006.01) |
| *B60N 2/30* | (2006.01) |
| *B60N 2/12* | (2006.01) |
| *B60N 2/36* | (2006.01) |
| *B60N 2/005* | (2006.01) |

(52) U.S. Cl.
CPC ............ *B60N 2/07* (2013.01); *B60N 2/0727* (2013.01); *B60N 2/08* (2013.01); *B60N 2/12* (2013.01); *B60N 2/309* (2013.01); *B60N 2/3011* (2013.01); *B60N 2/3013* (2013.01); *B60N 2/3065* (2013.01); *B60N 2/36* (2013.01); *B60N 2002/0055* (2013.01); *H05K 999/99* (2013.01)

(58) Field of Classification Search
CPC .......... B60N 2/07; B60N 2/0727; B60N 2/08; B60N 2/3011
USPC ....................................................... 297/340
See application file for complete search history.

(56) References Cited

U.S. PATENT DOCUMENTS

| | | | |
|---|---|---|---|
| 6,371,558 B1 | 4/2002 | Couasnon | |
| 2011/0049958 A1* | 3/2011 | Ma ......................... | B60N 2/065 297/378.12 |

FOREIGN PATENT DOCUMENTS

| | | | |
|---|---|---|---|
| FR | 2799702 | A1 | 4/2001 |
| FR | 2914241 | A1 | 10/2008 |
| FR | 2929564 | A1 | 10/2009 |
| FR | 2958229 | A1 | 10/2011 |
| FR | 2984247 | A1 | 6/2013 |

OTHER PUBLICATIONS

French Search Report in French for application No. FR1560272, dated Jul. 6, 2016, 6 pages.

* cited by examiner

*Primary Examiner* — Mark R Wendell
(74) *Attorney, Agent, or Firm* — Reising Ethington P.C.

(57) ABSTRACT

A seat having a fixed section, a movable section mounted so as to slide on the fixed section, a seating portion supported by the movable section, and a backrest mounted so as to rotate relative to the movable section to allow folding the backrest forward. The movable section is controlled to move rearward when the backrest is folded forward.

11 Claims, 7 Drawing Sheets

SEAT FOR MOTOR VEHICLE AND MOTOR VEHICLE COMPRISING SUCH A SEAT

TECHNICAL FIELD

The present invention relates to motor vehicle seats.

BACKGROUND

More particularly, the invention relates to a vehicle seat comprising:
- a sliding rail system having at least one fixed section intended to be mounted on a floor of a motor vehicle and at least one movable section mounted on the fixed section so as to slide in a longitudinal direction between a rearward longitudinal position and a forward longitudinal position,
- a seating portion supported by the movable section,
- a backrest supported by the movable section and mounted so as to rotate relative to said movable section about a tilt axis, to allow folding the backrest forward between a nominal position of the backrest where the seat can receive an occupant, and a folded position where the backrest extends horizontally with its front facing the seating portion.

Many examples of seats of this type are known. Document FR 2,958,229 describes an example of such a seat, adapted to allow tilting the backrest to a folded position. This seat uses a connecting rod mounted between a rear rod of the seating portion and a pin of the backrest. The connecting rod interacts with the seating portion to move it backward and then forward, while causing it to descend towards the floor of the vehicle.

SUMMARY

The present invention in at least some embodiments aims to improve motor vehicle seats of this type so that the seat is always folded under good conditions, regardless of the initial positioning of the sliding rail system.

To this end, a motor vehicle seat of the aforementioned type comprises means for controlling a movement of the movable section until a predetermined longitudinal position is reached, when the backrest is folded forward and the movable section is in an initial longitudinal position located forward of the predetermined longitudinal position. More precisely:
- the seating portion is connected to the backrest so that folding the backrest causes movement of the seating portion relative to the movable section,
- the seat further comprising a guide mechanism which connects the movable section to the seating portion, said guide mechanism including a contact portion adapted to abut against a stop when the backrest is folded and the movable section is in an initial longitudinal position located forward of the predetermined longitudinal position,
- said guide mechanism being adapted so that said movement of the seating portion relative to the movable section causes said rearward movement of the movable section on the fixed section by means of the guide mechanism, when said contact portion is in abutment against said stop,
- the seat further comprising a slide locking mechanism adapted to take either an active state or an inactive state, said slide locking mechanism preventing a sliding of the movable section when in the active state, and allowing the sliding of the movable section when in the inactive state, and
- the seat comprising a coupling device for placing the slide locking mechanism in the inactive state when the backrest is folded forwards.

These arrangements ensure that when the seat is in the folded position, it occupies a predetermined position relative to the vehicle floor. It is thus possible to obtain a backrest having its back continuous with a rear floor and/or to prevent the backrest of the seat from interfering with a front seat when folding the backrest.

In various embodiments of the seat according to the invention, one or more of the following arrangements may possibly be used:
- said predetermined longitudinal position is near the rearward longitudinal position;
- the guide mechanism comprises:
  - a first connecting rod mounted so as to pivot on the fixed section,
  - a second connecting rod mounted so as to pivot relative to the first rod and mounted so as to pivot relative to the seating portion;
- said contact portion is part of the second connecting rod;
- the contact portion and/or the stop is elastic and is adapted to absorb an impact when the contact portion comes into abutment against the stop;
- the coupling device is designed to place the slide locking mechanism in the inactive state when the backrest is folded to an unlocking angle relative to the nominal position, and the guide mechanism is designed so that the contact portion comes into abutment against the stop when the backrest is folded to an intermediate angle larger than the unlocking angle;
- said stop is part of the seating portion;
- the seating portion comprises:
  - at least one side plate,
  - at least one front foot mounted so as to pivot relative to the movable section and relative to the side plate,
  the stop being either on the side plate or on the front foot;
- the seating portion is mounted so as to pivot relative to the backrest on a folding axis that is distinct from the tilt axis.

The invention also relates to a motor vehicle comprising a floor and a seat as set forth above, wherein the fixed section is mounted on said floor.

BRIEF DESCRIPTION OF DRAWINGS

Other features and advantages of the invention will be apparent from the following description of some embodiments, given by way of non-limiting example and with accompanying drawings.

In the drawings:

FIG. 8 corresponds to the position of FIG. 3, the seat being in a rearward position on its rails and the backrest being in the nominal position for receiving a seat occupant;

FIG. 9 corresponds to the position of FIG. 4, the seat being in a forward position on its rails and the backrest being in the nominal position;

FIG. 10 corresponds to the position of FIG. 5, the backrest being tilted to an intermediate position;

FIG. 11 corresponds to the position of FIG. 6, the backrest being tilted to a position beyond the intermediate position; and FIG. 12 corresponds to the position of FIG. 7, the backrest being in the folded position.

DETAILED DESCRIPTION OF EMBODIMENTS

In the various figures, the same reference numerals designate identical or similar structural and/or functional elements.

In the description that follows, when qualifiers are used to describe the absolute position (such as the terms "front", "rear", "top", "bottom", "left", "right", etc.), the relative position (such as the terms "above", "below", "upper", "lower", etc.), or the orientation (such as the terms "vertical", "horizontal", etc.), this is in reference to a seat in a normal position of use when the vehicle is moving in the usual direction, which corresponds to the longitudinal direction X in the figures, which is perpendicular to a transverse direction Y and an upward-oriented vertical direction Z. The X and Y directions form a horizontal plane XY.

Unless otherwise indicated, the terms "approximately", "substantially", "about", "on the order of", etc. mean that a slight variation from a certain reference value is possible, particularly by a small percentage, particularly 10%.

Figure 1:
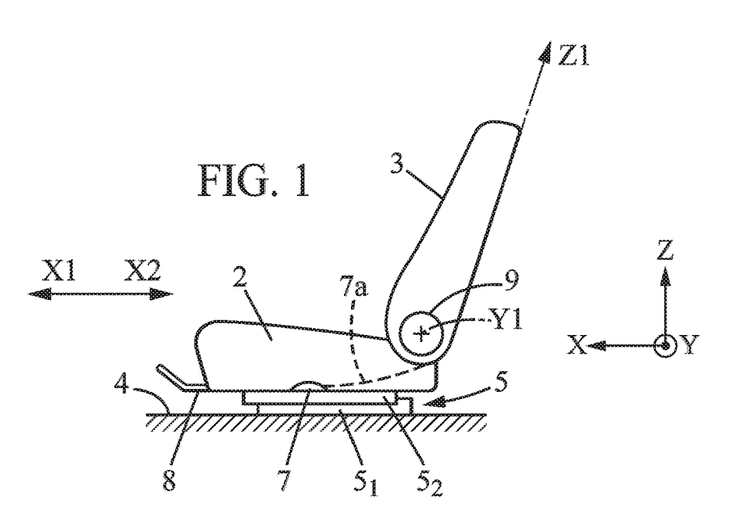
FIG. 1 is a schematic side view of a motor vehicle seat.

FIG. 1 is a schematic view of a seat 1, in particular a vehicle seat comprising a seating portion 2 and a backrest 3, the seating portion being attached to a floor 4 of the vehicle, said floor being considered to be fixed and substantially in the horizontal plane XY.

Figure 2:
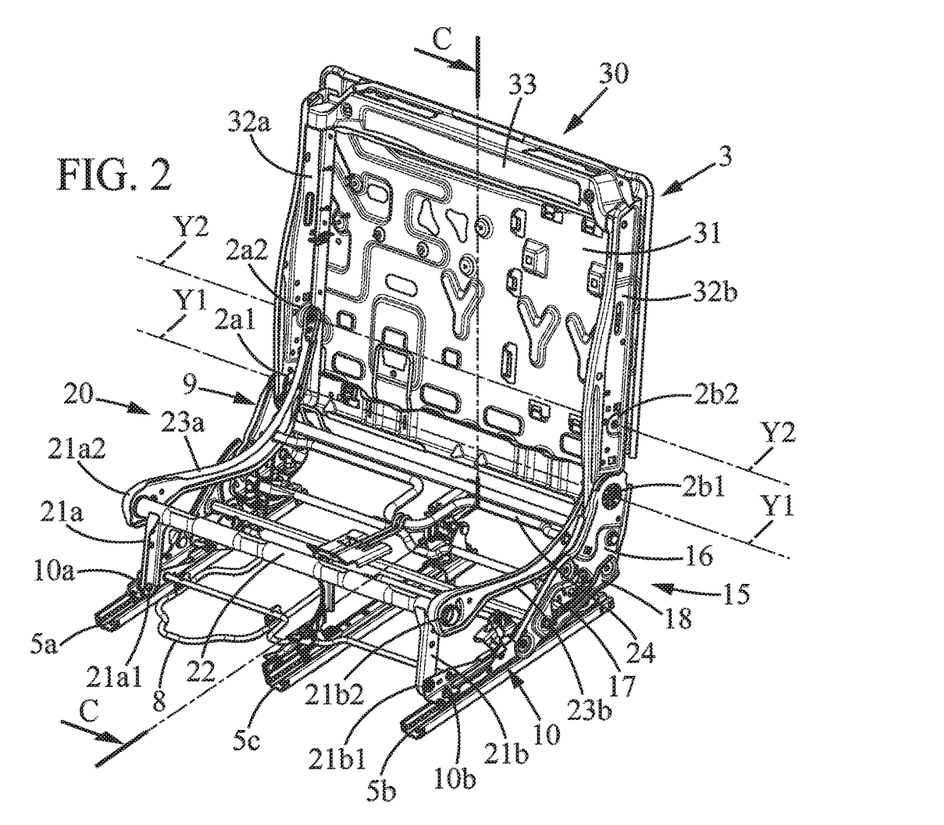
FIG. 2 is a perspective view of a seat frame of a first embodiment of the invention.

The seating portion 2 is connected to the floor 4 by a sliding rail system 5 which comprises, for example, a first rail 5a on the right side and a second rail 5b on the left side of the seat, said rails being parallel to each other and extending in a longitudinal direction X. It is possible for the sliding rail system 5 to comprise more than two rails, and for example as represented in the embodiment of FIG. 2 which corresponds to a bench seat, the sliding rail system 5 also comprises a third rail 5c located between the first and second rails.

Each of the first and second rails 5a, 5b comprises a first fixed section 51 and a second movable section 52 which extend in the longitudinal direction X and are adapted to slide relative to one another in a first direction X1 (forward) or in a second direction X2 (backward), the second direction X2 being opposite to the first direction X1. The first section $5_1$ (the fixed section) is, for example, secured to the fixed floor 4, and the second section $5_2$ (the movable section) is secured to a seating structure of the seat.

The sliding rail system 5 therefore allows adjusting the longitudinal position of the seat relative to the floor 4. It also has at least one slide locking mechanism 7 which can be in either an active state where it prevents the sliding rail system 5 from sliding (normal state in the absence of applied force), or an inactive state where it allows such sliding. The slide locking mechanism 7 is, for example, actuated by the user by a sliding control member 8, such as a release lever or some other member.

Coupling means 7a (for example a sheathed cable or other mechanical transmission) are further provided so that, when a user folds the backrest 3 forward, the locking mechanism 7 is set to the inactive state.

The seat 1 also comprises a base 10, fixed to the second sections $5_2$ and, for example, consisting of two parts 10a, 10b, one on each second section, said base 10 connecting together the front and rear of the seat at the sliding rail system, to facilitate assembly. As the base 10 is integral to the second section, the parts mounted on the base 10 are in fact mounted on the second section.

The backrest 3 is mounted on rear portions of the base 10, so as to pivot about a tilt axis Y1 parallel to the transverse direction Y. In the X-Z plane, the backrest 3 in nominal position extends upwards in a backrest direction Z1 that is inclined by a tilt angle relative to the vertical direction Z. On one side of the backrest 3, a hinge mechanism 9 is interposed between the base 10 and the backrest 3. Such hinge mechanisms 9 are well known, and can be actuated by the seat user by means of a tilt adjustment control device in order to adjust the backrest 3 relative to the base 10 (or the seating portion 2) and thus adjust the nominal position of comfort of the seating portion.

Figure 3:
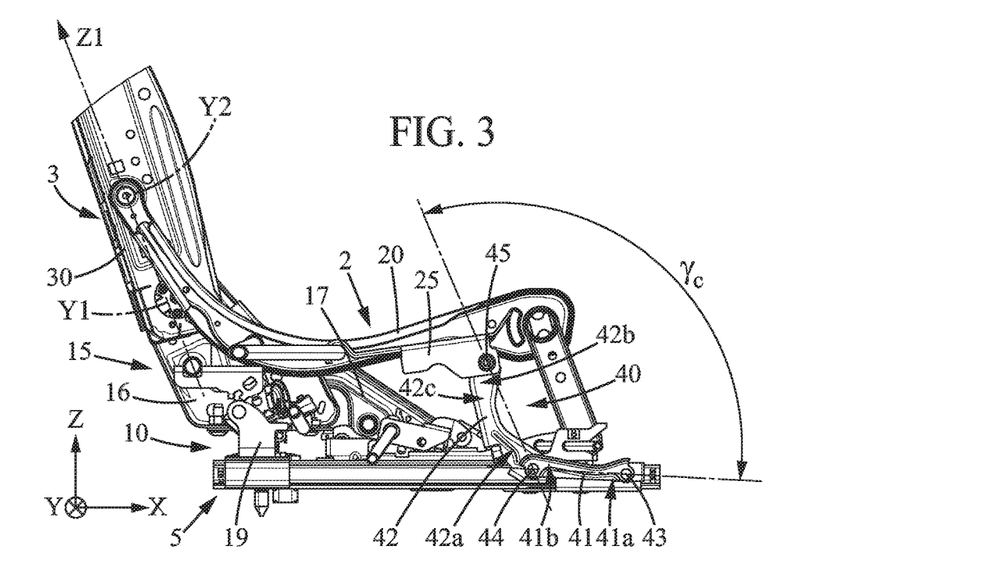
FIG. 3 is a sectional view along axis C-C of FIG. 2, the seat being in a rearward position on its rails and the backrest being in the nominal position for receiving a seat occupant.
Figure 7:
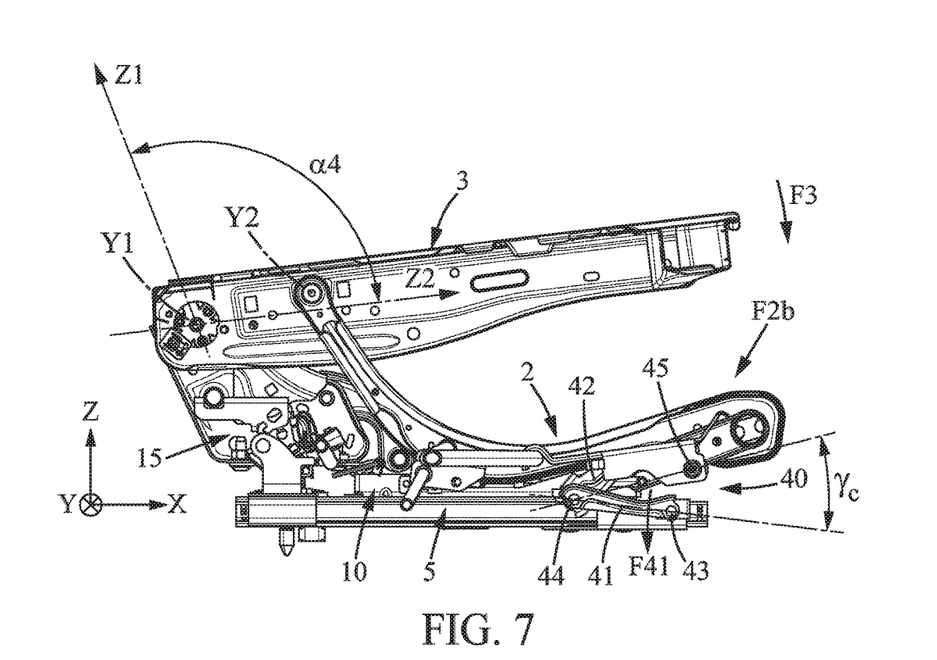
FIG. 7 is a sectional view along axis C-C of FIG. 2, the backrest being in the folded position.
Figure 8:
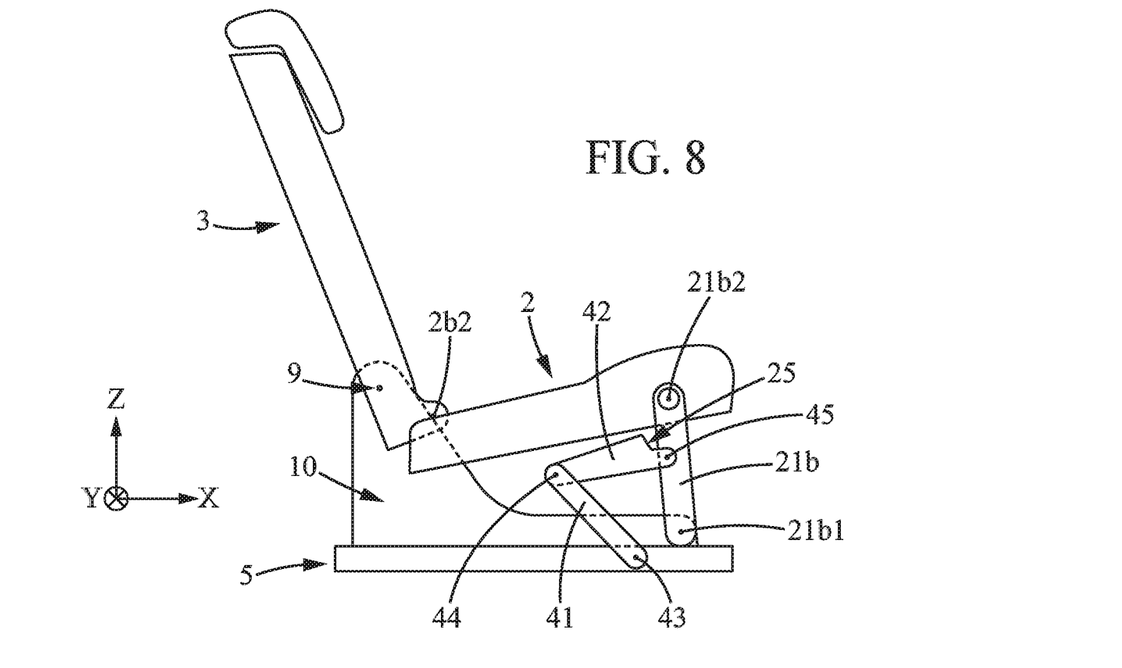
FIGS. 8 to 12 are schematic sectional views of a second embodiment of the invention.
Figure 9:
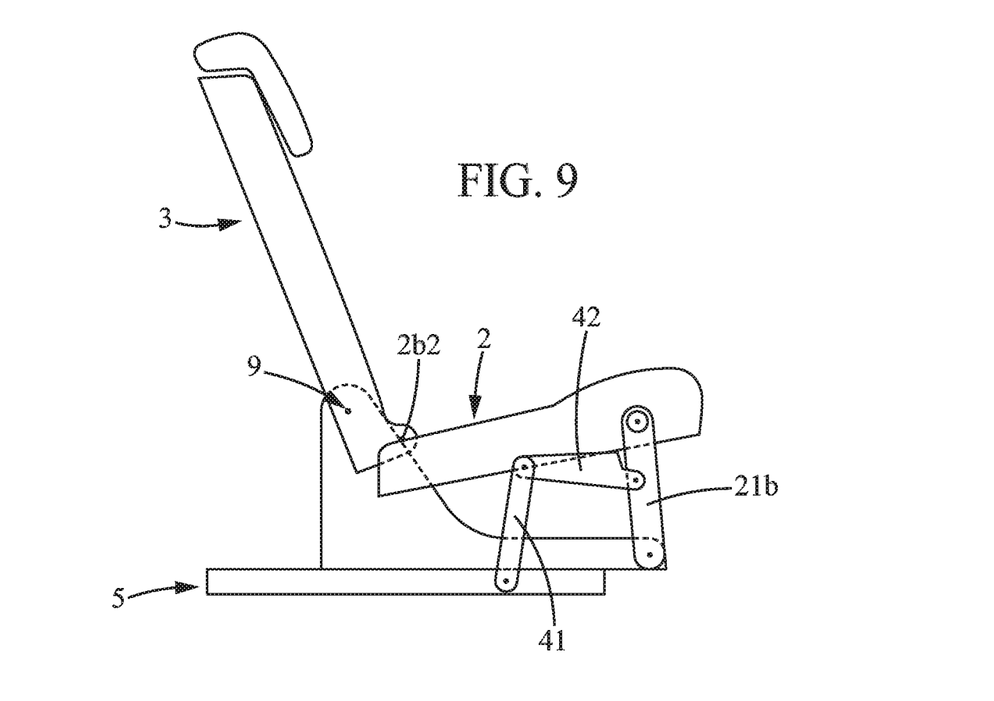
Figure 10:
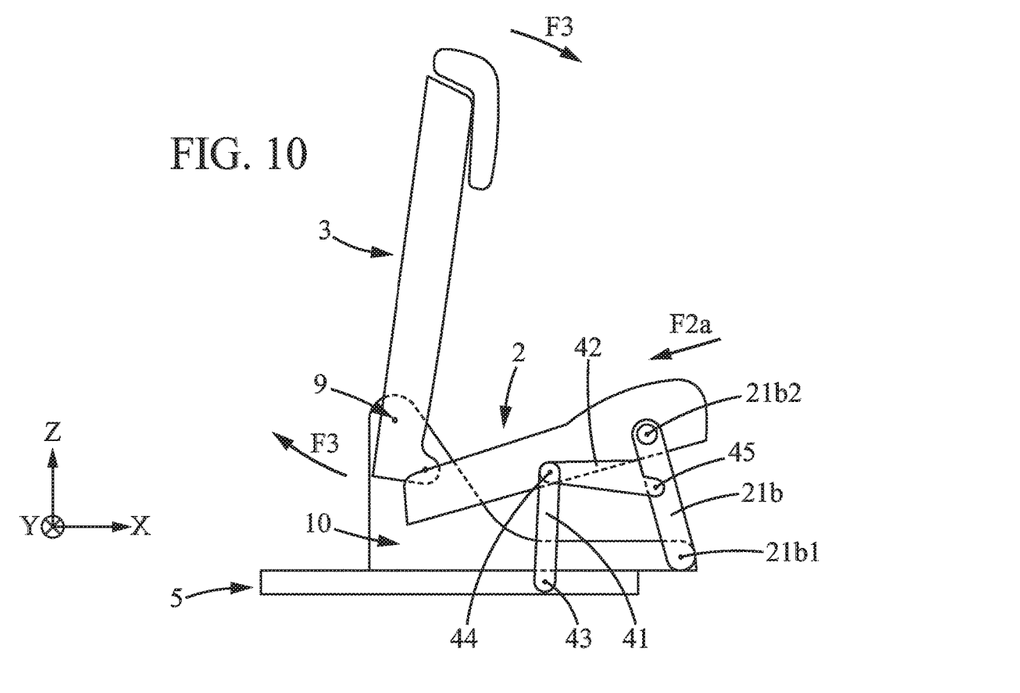
Figure 11:
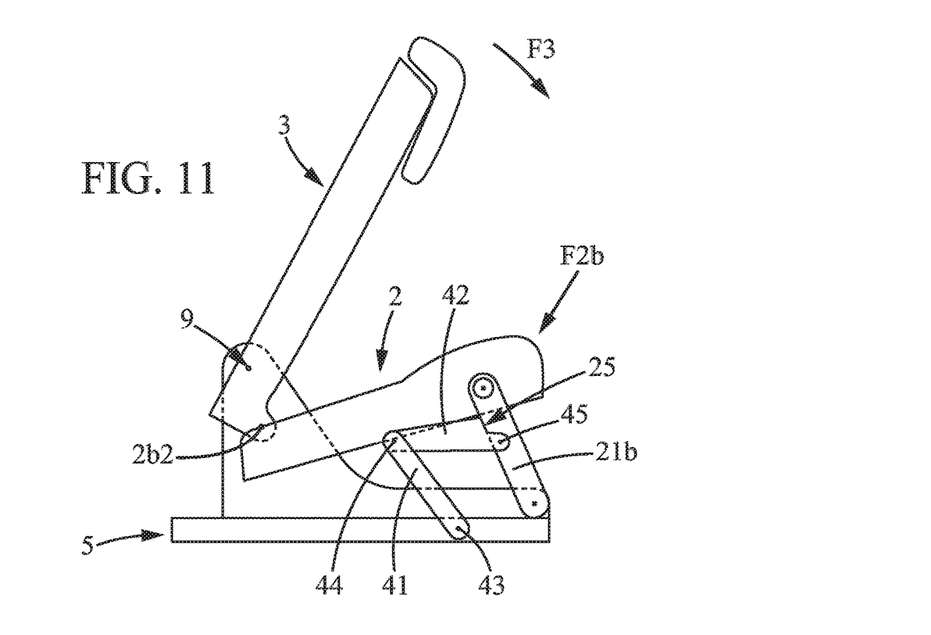
Figure 12:
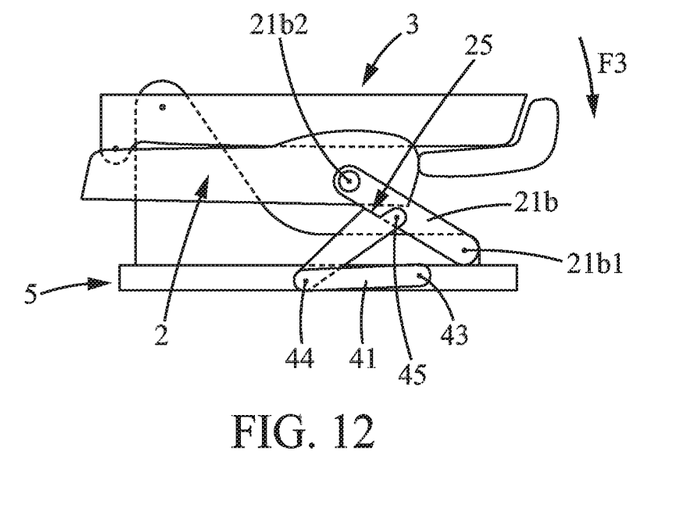

This hinge mechanism 9 also includes a tilt locking member which may be actuated by a folding control member, such as a handle, for changing between an active state where it prevents rotation of the backrest 3 relative to the base 10, or an inactive state where it allows rotation of the backrest 3 between a nominal position (position of comfort) represented in FIGS. 2, 3, and 8, and a folded position (flat) represented in FIGS. 7 and 12. In the nominal position, the backrest 3 of the seat is angled so that the user can occupy the seat, with the user's back against the backrest. In the folded position, the backrest 3 of the seat is substantially horizontal, for example to support a load or allow loading the vehicle.

FIGS. 2 to 7 show a first embodiment of the invention, of which the structural elements and operation will be explained in detail below.

The seating portion 2 of the seat 1 comprises a seating structure 20, composed for example of connecting rods, plates, and other crosspieces, a more specific perspective view of said seating structure being provided in FIG. 2, the padding not being represented in order to reveal this seating structure of the seat. These elements of the seating structure are rigid parts that are hinged to one another to define a predetermined shape adapted to the position of the backrest, from the nominal position to the folded position.

The seating structure 20 is substantially symmetrical with respect to a vertical plane defined by directions X-Z, and it comprises:

front feet 21a, 21b,
a front crosspiece 22 connecting said front feet 21a, 21b,
side plates 23a, 23b.

Each front foot 21a, 21b has the shape of a connecting rod of constant length, pivotally mounted at its two ends. Front foot 21a thus comprises an end 21a1 mounted so as to pivot on the base 10 and an upper end 21a2 integral with a right portion of the front crosspiece 22. Conversely, front foot 21b thus comprises an end 21b1 mounted so as to pivot on the base 10 and an upper end 21b2 integral with a left portion of the front crosspiece 22.

Each side plate 23a, 23b has the shape of a connecting rod of constant length which extends rearward from a front foot. Advantageously, these side plates 23a, 23b have a shape that curves upward and rearward to a respective back end 23a1, 23b1, where they are each hinged to pivot on a pin 2a2, 2b2 mounted on the backrest 3, said pins 2a2, 2b2 being aligned along a folding axis Y2 located above the tilt axis Y1.

The backrest 3 of the seat 1 comprises a backrest structure 30, for example composed of:
- a back 31, for example formed of a substantially flat plate, side plates 32a, 32b, each integral to the back 31 and extending upwards from the base 10 to a high portion of the backrest, and
- a top crosspiece 33, integral to the back 31 and connecting the side plates 32a, 32b in the transverse direction Y.

The backrest structure 30 thus forms a rigid frame suitable for supporting backrest padding to provide comfort for the back of the user of the seat 1.

The backrest 3 is then hinged so as to pivot relative to the base 10 about the tilt axis Y1 at lower ends 2a1, 2b1.

Thus, the distance between the successive points 21a1, 21a2, 2a2, 2a1 is constant during any use of the seat, and the quadrilateral formed by said points is a deformable quadrilateral. An identical deformable quadrilateral is formed by the successive points of the right side 21b1, 21B2, 2b2, and 2b1. These quadrilaterals thus define the general shape of the seating structure 20 and the possible movements of this seating structure 20 relative to the base 10. This general shape is determined by the angle of tilt of the backrest 3, which then extends in a different direction Z2 than direction Z1, in particular when folding the backrest 3 about the tilt axis Y1 (when the tilt locking member is actuated to the inactive state), for example between the nominal position and the folded position.

The seating structure 20 may further comprise a rear crosspiece 24 that connects the two side plates 23a, 23b at the rear in order to form a stronger rigid frame and better support the seat padding (not shown).

The seat 1 further comprises a guide mechanism 40. Unlike to the seating structure 20 which defines the movements of the seating portion 2 relative to the base 10 (or sliding rail system 5), the guide mechanism 40 defines the movements of the seating portion 2 relative to the floor 4 of the vehicle under certain conditions.

This guide mechanism 40 is most easily seen in FIGS. 3 to 7 which are sectional views along X-Z of the seat 1 in the various possible positions, and specifically showing the movements of the elements of the seating portion 2, backrest 3, and guide mechanism 40.

According to one embodiment, the guide mechanism 40 comprises a first connecting rod 41 and a second connecting rod 42 which are serially connected and which pivot relative to one another about an intermediate connecting pin 44 between said rods.

The first connecting rod 41 is mounted at a first end 41a so as to pivot on a pivot pin 43 connected to the floor 4, for example via a support, and mounted at a second end 41b so as to pivot on the connecting pin 44.

The second connecting rod 42 is mounted at a first end 42a so as to pivot on the connecting pin 44 and at a second end 42b so as to pivot on a guide pin 45 connected to the seating structure 20.

The second connecting rod 42 comprises a contact portion 42c adapted to come into abutment against or to abut against a stop 25 integral to an element of the seating structure 20, such as a longitudinal (X direction) crosspiece as shown in figures, or a transverse (Y direction) crosspiece.

This abutment assembly (contact portion and stop) thus allows limiting the angular displacement of the second connecting rod 42 relative to the seating portion 2.

When the contact portion 42c of the second connecting rod 42 is not in abutment against the stop 25, the first and second connecting rods are both free to pivot on their two respective pins, and in particular, the second end 42b of the second connecting rod 42 may take any position around the pivot pin 43, at a distance from this pivot pin 43 that is less than the sum of the lengths of the first and second connecting rods 41, 42. The guide mechanism 40 is then in a free state, where it does not interfere with the seating portion 2. In this free state, the guide mechanism 40 has two degrees of freedom: the two rotations of the connecting rods.

When the contact portion 42c of the second connecting rod 42 abuts against the stop 25, only the first connecting rod 41 can pivot about the pivot pin 43. The second end 41b of the first connecting rod 41 (connecting pin 44) can move along a path following an arc of a circle centered on the pivot pin 43. The guide mechanism 40 is then in a constrained state where it interferes with the seating portion 2, forcing the seating portion 2 to move rearward due to the translational rearward sliding of the base 10 relative to the vehicle floor. Thus, when folding the backrest 3 forward, the guide mechanism 40 forces the entire seat (seating portion and back) to move rearward at the same time as the seating portion 2 descends closer to the floor 4 by the rotation of the first connecting rod 41, until the backrest 3 is facing the seating portion 2, in other words reaches the folded position.

Figure 4:
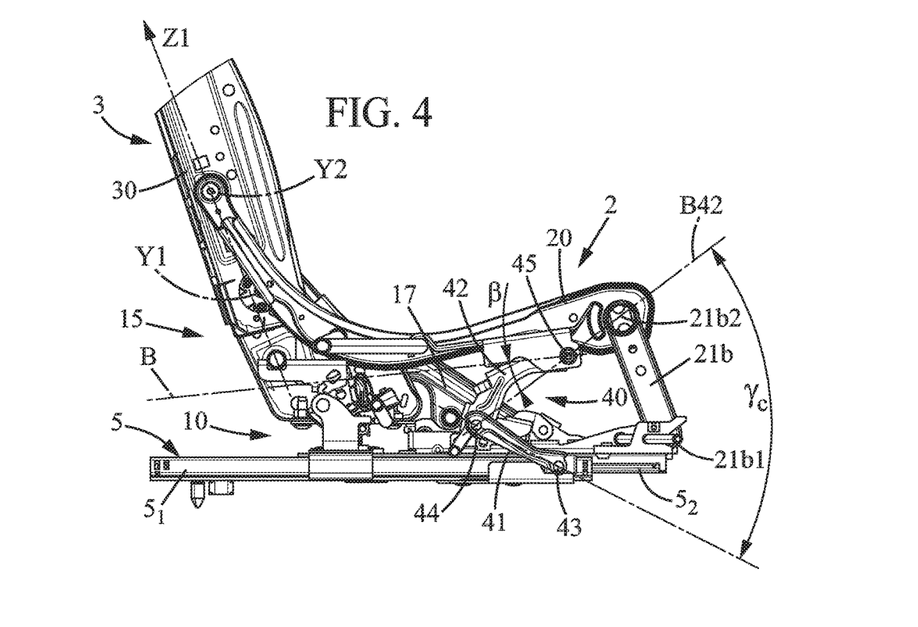
FIG. 4 is a sectional view along axis C-C of FIG. 2, the seat being in a forward position on its rails and the backrest being in the nominal position.
Figure 5:
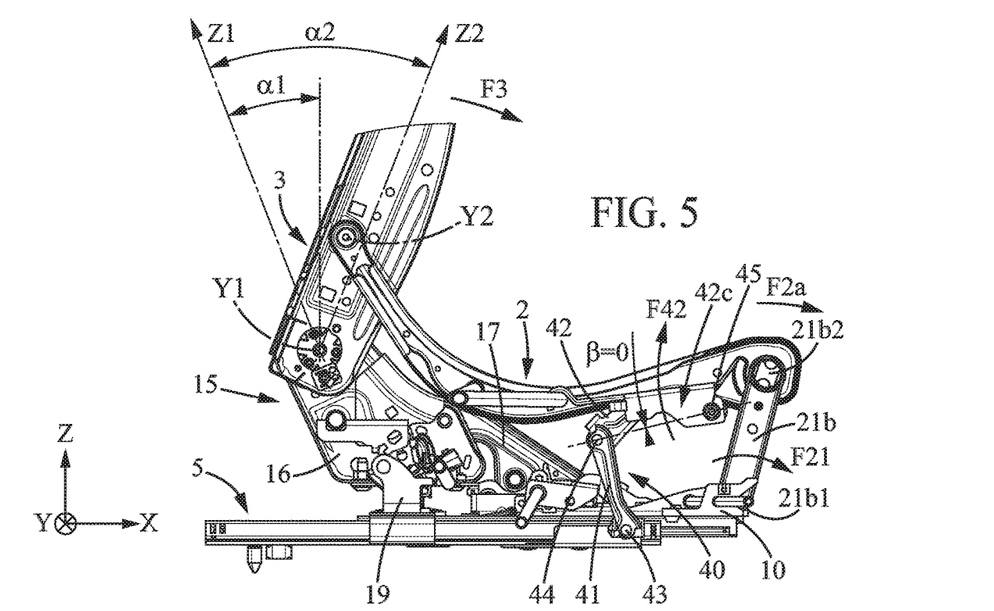
FIG. 5 is a sectional view along axis C-C of FIG. 2, the backrest being tilted to an intermediate position.

The connecting rods of the guide mechanism 40 are sized (length) and positioned between the floor 4 and the seating portion 2 so that, when the sliding rail system 5 is in the advanced position as shown in FIG. 4, the second connecting rod 42 is not in abutment, meaning that the guide mechanism 40 is still in a free state. In this position, the second connecting rod 42 is oriented in a connecting rod direction B42. When this second connecting rod 42 abuts against the stop 25 (as represented in FIG. 5), it is oriented in a stop direction B. These two directions, connecting rod direction B42 and stop direction B, therefore form, in the advanced position of the sliding rail system 5 and the nominal position of the backrest 3, a connecting rod angle β of for example between 5 degrees and 30 degrees, and preferably between 5 degrees and 15 degrees.

In addition, the first and second connecting rods 41, 42 of the guide mechanism 40 form a scissor shape of angle $\gamma_c$ in the advanced nominal position of the sliding rail system 5 of FIG. 4 that is very open, for example between 50 degrees and 80 degrees. In this longitudinal position of the seat, sufficiently forward on its rails 5, the guide mechanism 40 changes from the free state to the constrained state as the backrest 3 is folded toward the seating portion 2, thereby causing its rearward movement.

The first and second connecting rods 41, 42 of the guide mechanism 40 form a scissor shape of angle $\gamma_c$ in the rearward nominal position of the sliding rail system 5 of FIG. 3 that is even more open, for example between 90 degrees and 150 degrees. In this longitudinal position of the seat, sufficiently rearward on its rails 5, the guide mechanism 40 remains in a free state throughout the folding of the backrest 3 toward the seating portion 2 and naturally forms a flat floor that is continuous with a rear floor.

The base 10 may further comprise, towards the rear of the seat, a lifting mechanism 15 comprising:

a lifting base 16 comprising the tilt axis Y1 and on which the backrest 3 is rotatably mounted, a front connecting rod 17 and rear connecting rod 18, both hinged to pivot on a fixed portion of the base (integral to the movable section of the sliding rail system) and on the lifting base.

The two connecting rods 16, 17 form a deformable parallelogram which allows raising the lifting base 16 relative to the fixed portion of the base, therefore the entire backrest 3 of the seat, when a lift locking member 19 enters an inactive state where the fixed portion of the base and the lifting base are uncoupled. When the lift locking member 19 is in an active state, the fixed portion of the base and the lifting base are coupled and form an integral assembly. A lifting control member is actuated by a user to change the lift locking member 19 to an active state, and to swing the backrest 3 of the seat upward and thus, for example, facilitate access by a user to a rear seat.

The operation of the seat described above will now be described in more detail.

Referring to FIGS. 3 and 4, the seat is presented with its backrest 3 in a nominal position where an occupant can be positioned in the seat. The occupant may make an adjustment to the longitudinal position of the seat by actuating a release lever or sliding control member 8, which places the slide locking mechanism 7 in an inactive state. The second section 5$_2$ (movable) is thus unlocked from the first section 5$_1$ (fixed). The occupant can then slide the seat relative to the floor 4 of the vehicle in the longitudinal direction X, to any position between the rearward position of FIG. 3 and the forward position of FIG. 4. The guide mechanism 40 does not interfere with the seating portion 2 anywhere within this entire range of longitudinal positions, and does not affect the translational movement of the seating portion 2 along the longitudinal direction X. in particular, the guide mechanism 40 does not exert a return force on the seating portion which can exist with the resilient positioning means conventionally used.

When the user of the seat wishes to place it in the folded position of FIG. 7, where the backrest 3 lies substantially horizontally with its front face facing the upper face of the seating portion, such that the rear face of the backrest forms for example a horizontal surface that is preferably continuous with the floor of a trunk area of the vehicle, the user actuates the folding control member to permit rotation of the backrest 3 relative to the base 10 about the tilt axis Y1. The backrest 3 of the seat will then first fold along a first range of rotation from the nominal position, such as that of FIG. 4, to an intermediate position represented in FIG. 5.

In this first range of rotation of the backrest, between the nominal position and the intermediate position, the coupling means 7*a* automatically actuate the slide locking mechanism 7 to its inactive state when the backrest 3 is rotated, for example as soon as the backrest has tilted by an unlocking angle α1. Thus, when the backrest 3 reaches the intermediate position of FIG. 5, the seat 1 is able to slide in the longitudinal direction X. Before this unlocking action of the slide locking mechanism, the seating portion 2 can only move forward by pivoting the upper ends 21*a*2, 21B2 of the front feet 21*a*, 21*b*. After this unlocking, the seating portion 2 can still move forward by pivoting the upper ends of the front feet, but the lower ends 21*a*1, 21*b*1 of the front feet 21*a*, 21*b* can also move rearward because the second section 5$_2$ of the sliding rail system, on which the base 10 is mounted, is able to slide rearward in the longitudinal direction X.

In the intermediate position of FIG. 5, forward rotation of the backrest 3 about the tilt axis Y1 in the direction of arrow F3 causes the seating portion 2 to be advanced in the direction of arrow F2*a* by the displacement of the side plates 23*a*, 23*b*, said advance being slightly upward followed by a slight descent, but in general substantially horizontal in the longitudinal direction X. This movement is linked to the forward rotation, as indicated by arrow F21, of the front feet 21*a*, 21*b* about pins at their lower ends 21*a*1, 21*b*1, this rotation caused by the advancing of the seating structure 20 of the seating portion.

The movement of the seating structure 20 described above has the effect of displacing the guide mechanism 40, which sees its second connecting rod 42 pivot about the guide pin 45 and rise toward the seating structure 20, until the intermediate position of FIG. 5 is reached, where the contact portion 42*c* of the second connecting rod 42 comes into contact with the stop 25 of the seating structure 20, which puts the guide mechanism 40 in a constrained state.

In this intermediate position, the backrest 3 has tilted by an intermediate angle α2 (greater than the unlocking angle α1). This intermediate angle α2 is a function of the connecting rod angle β of the second connecting rod 42 in the nominal position of FIG. 4. This relationship can be determined by the geometric relationships existing between the elements of the seating portion 2, backrest 3, and guide mechanism 40.

This intermediate angle α2 is dependent, of course, on the initial longitudinal position of the seat on its rails 5. The closer the longitudinal position to the advanced position of FIG. 4, the smaller this intermediate angle. On the other hand, if the seat is initially in the rearward longitudinal position of FIG. 3, the guide mechanism 40 remains in the free state and this intermediate angle does not exist.

Figure 6:
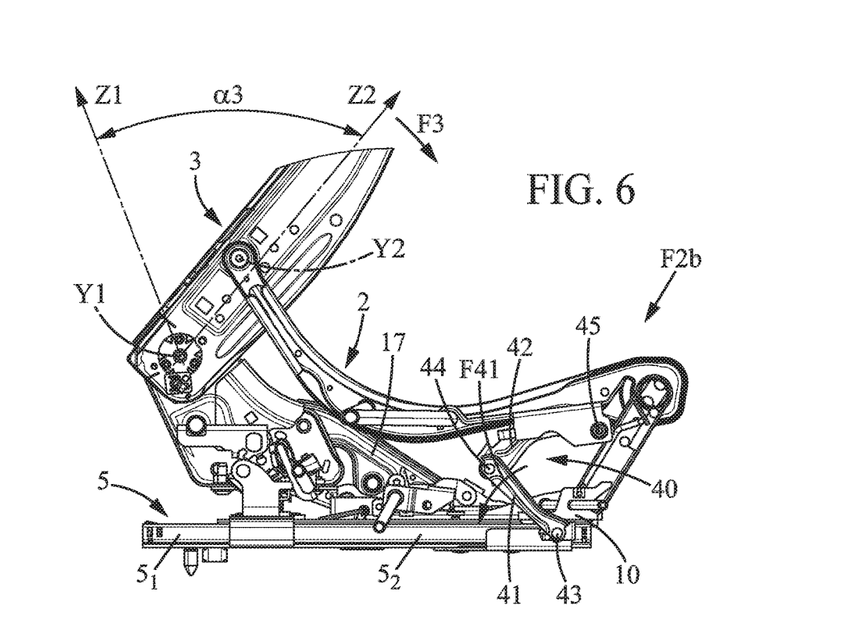
FIG. 6 is a sectional view along axis C-C of FIG. 2, the backrest being tilted to a position beyond the intermediate position.

If the user continues the forward rotation of the backrest 3 about the tilt axis Y1 as indicated by arrow F3, represented in FIG. 6, the guide mechanism 40 being in the constrained state (second connecting rod 42 in abutment against the seating portion 2), and now accepting only one degree of freedom, the seating portion 2 can no longer continue to move forward and only the first connecting rod 41 pivots about the pivot pin 43 (arrow F41) connected to the fixed floor 4 of the motor vehicle. The movement of the seat 1 continues due to this rotation of the first connecting rod 41. The guide pin 45 of the guide mechanism 40 thus moves in the direction of the pivot pin 43, as represented by arrow F2*b* in FIG. 6. The seating portion 2 follows such a roughly translational circular movement because its upper surface remains substantially horizontal but pivots rearward and downward around the pivot pin 43.

In fact, a sub-assembly of the seat 1 (base, seating portion, and backrest) is moved rearward due to the slide locking mechanism 7 having been switched to the inactive state as soon as the tilt angle exceeded the unlocking angle α1.

Simultaneously, the seating portion 2 is lowered to approach the floor 4 of the vehicle.

The movement of the seating portion 2 and backrest 3 continues all the more easily after the backrest 3 is folded forward as indicated by arrow F3, as the center of gravity of the backrest 3 is shifted increasingly forward relative to the tilt axis Y1.

The rotational movement of the backrest 3 can continue until the folded position of FIG. 7 is reached, where the seating portion 2 is completely lowered onto the base 10. The first connecting rod 41 is now in a more or less horizontal position. The first and second connecting rods 41, 42 of the guide mechanism 40 then form a scissor shape in the folded position defining an angle that is very acute, for example between 10 degrees and 30 degrees.

With this guide mechanism 40, the seat is always in the rearward longitudinal position when it is folded, regardless of its original longitudinal position. This prevents interference between the backrest 3 and a front seat and/or allows precise integration of the folded seat into the floor of the vehicle at a predetermined position.

FIGS. 8 to 12 show a second embodiment of the invention, represented highly schematically and in to cross-sectional views similar to those of FIGS. 3 to 7 of the first embodiment, meaning in equivalent positions.

This second embodiment has substantially the same elements and it functions substantially identically to the first embodiment of the invention; therefore all the common elements will not be detailed here but will be understood from the description of the first embodiment. This second embodiment differs from the first in the following.

First, the connection between the seating portion 2 and the backrest 3 is different, because now the folding axis Y2 is located below the tilt axis Y1 in the nominal position. Thus, the moment the folding of the backrest 3 beings, this causes a rearward movement or retreat of the seating portion 2 relative to the base 10, while in the first embodiment the seating portion 2 began to move forward on its front feet.

Then, after the intermediate position where the guide mechanism 40 changes to the constrained state, this rearward movement of the seating portion 2 is amplified by the (rearward) slide, relative to the floor 4, of the seat assembly constituted by the base 10, the seating portion 2, the backrest 3, due to the sliding rail system 5 being unlocked.

Second, the stop 25 is integral to one of the front feet 21a, 21b of the seating portion 2, whereas in the first embodiment the stop 25 was integral to a crosspiece of the seating portion 2.

Third, the guide pin 45 for the pivoting of the second connecting rod 42 relative to the seating portion 2 is located on a front foot 21a, 21b, while in the first embodiment, this guide pin 45 was on a crosspiece of the seating structure.

One or more of these arrangements may be independently combined with those of the first embodiment.

The invention claimed is:

1. Motor vehicle seat comprising:
 a sliding rail system having at least one fixed section intended to be mounted on a floor of a motor vehicle and at least one movable section mounted on the fixed section so as to slide in a longitudinal direction between a rearward longitudinal position and a forward longitudinal position,
 a seating portion supported by the movable section,
 a backrest supported by the movable section and mounted so as to rotate relative to said movable section about a tilt axis, to allow folding the backrest forward between a nominal position of the backrest where the seat can receive an occupant and a folded position where the backrest extends horizontally with its front facing the seating portion,
 wherein the seating portion is connected to the backrest so that folding the backrest causes movement of the seating portion relative to the movable section,
 the seat further comprising a guide mechanism which connects the movable section to the seating portion, said guide mechanism including a contact portion adapted to abut against a stop when the backrest is folded and the movable section is in an initial longitudinal position located forward of a predetermined longitudinal position,
 said guide mechanism being adapted so that said movement of the seating portion relative to the movable section caused by the folding of the backrest, causes a rearward movement of the movable section on the fixed section to said predetermined longitudinal position by means of the guide mechanism, when said contact portion is in abutment against said stop,
 the seat further comprising a slide locking mechanism adapted to take either an active state or an inactive state, said slide locking mechanism preventing a sliding of the movable section when in the active state, and allowing the sliding of the movable section when in the inactive state, and
 the seat comprising a mechanical transmission actuatable by the backrest and controlling the slide locking mechanism, the mechanical transmission being configured to place the slide locking mechanism in the inactive state when the backrest is folded forwards.

2. Seat according to claim 1, wherein said predetermined longitudinal position is near the rearward longitudinal position.

3. Seat according to claim 1, wherein the guide mechanism comprises:
 a first connecting rod mounted so as to pivot on the fixed section,
 a second connecting rod mounted so as to pivot relative to the first rod and mounted so as to pivot relative to the seating portion.

4. Seat according to claim 3, wherein said contact portion is part of the second connecting rod.

5. Seat according to claim 1, wherein the contact portion and/or the stop is elastic and is adapted to absorb an impact when the contact portion comes into abutment against the stop.

6. Seat according to claim 1, wherein the mechanical transmission is designed to place the slide locking mechanism in the inactive state when the backrest is folded to an unlocking angle relative to the nominal position, and the guide mechanism is designed so that the contact portion comes into abutment against the stop when the backrest is folded to an intermediate angle greater than the unlocking angle.

7. Seat according to claim 1, wherein said stop is part of the seating portion.

8. Seat according to claim 7, wherein the seating portion comprises:
 at least one side plate,
 at least one front foot mounted so as to pivot relative to the movable section and relative to the side plate,
 the stop being either on the side plate or on the front foot.

9. Seat according to claim 1, wherein the seating portion is mounted so as to pivot relative to the backrest on a folding axis that is distinct from the tilt axis.

10. Motor vehicle comprising a floor and a seat according to claim 1, wherein the fixed section is mounted on said floor.

11. Motor vehicle seat comprising:
 a sliding rail system having at least one fixed section intended to be mounted on a floor of a motor vehicle and at least one movable section mounted on the fixed section so as to slide in a longitudinal direction between a rearward longitudinal position and a forward longitudinal position,
 a seating portion supported by the movable section,
 a backrest supported by the movable section and mounted so as to rotate relative to said movable section about a tilt axis, to allow folding the backrest forward between a nominal position of the backrest where the seat can receive an occupant and a folded position where the backrest extends horizontally with its front facing the seating portion, wherein the seating portion is connected to the backrest so that folding the backrest causes movement of the seating portion relative to the movable section, the seat further comprising a guide mechanism which connects the movable section to the seating portion, said guide mechanism including a contact portion adapted to abut against a stop when the backrest is folded and the movable section is in an initial longitudinal position located forward of a predetermined longitudinal position, said guide mechanism being adapted so that said movement of the seating portion relative to the movable section caused by the folding of the backrest, causes a rearward movement of the movable section on the fixed section to said predetermined longitudinal position by means of the guide mechanism, when said contact portion is in abutment against said stop, the seat further comprising a slide locking mechanism adapted to take either an active state or an inactive state, said slide locking mechanism preventing a sliding of the movable section when in the active state, and allowing the sliding of the movable section when in the inactive state, wherein the slide mechanism is actuatable by the backrest and placed in the inactive state when the backrest is folded forward.

\* \* \* \* \*